United States Patent [19]

Fauth et al.

[11] 4,131,352

[45] Dec. 26, 1978

[54] PHOTOGRAPHIC APPARATUS OF THE SELF-DEVELOPING TYPE

[75] Inventors: Günter Fauth, Unterhaching; Herbert Müller, Assling, both of Fed. Rep. of Germany

[73] Assignee: AGFA-Gevaert AG, Leverkusen, Fed. Rep. of Germany

[21] Appl. No.: 801,386

[22] Filed: May 27, 1977

[30] Foreign Application Priority Data

May 29, 1976 [DE] Fed. Rep. of Germany ....... 2624209

[51] Int. Cl.$^2$ .............................................. G03B 17/50
[52] U.S. Cl. ...................................................... 354/86
[58] Field of Search ..................... 354/88, 86, 304, 301

[56] References Cited

U.S. PATENT DOCUMENTS 3,120,794  2/1964  Gold ..................................... 354/301
3,871,010  3/1975  Whall .................................... 354/86

FOREIGN PATENT DOCUMENTS 1021752  3/1966  United Kingdom ..................... 354/301

Primary Examiner—Donald A. Griffin
Attorney, Agent, or Firm—Michael J. Striker

[57] ABSTRACT

An improved pressure roller in a photographic apparatus of the self-developing type is disclosed. The roller has a rigid core provided with two axially spaced circumferential grooves which are filled with resiliently compressible material. The core is jacketed with a resilient sheath which covers its circumferential surface, including the grooves and the material therein.

8 Claims, 1 Drawing Figure

U.S. Patent      Dec. 26, 1978      4,131,352
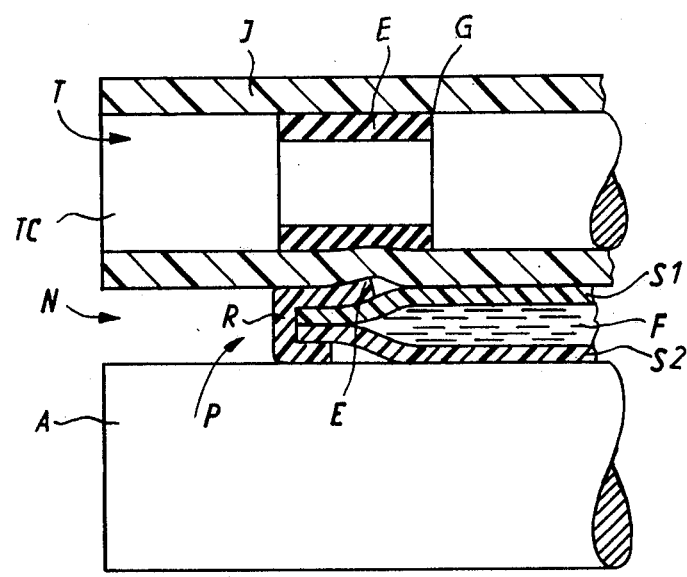

PHOTOGRAPHIC APPARATUS OF THE SELF-DEVELOPING TYPE

BACKGROUND OF THE INVENTION

This invention relates to photographic apparatus of the self-developing type.

More particularly, the invention relates to an improved pressure roller used in such apparatus, and to a method of making such roller.

Such photographic self-developing apparatus uses film packs containing a (usually rectangular) film area to be developed and a processing fluid supply. The pack is advanced through a nip defined between two pressure rollers for spreading the processing fluid over the rectangular film or developing area. One of the rollers may be provided with a jacket of elastic material.

One of the major problems of such self-developing systems resides in the distribution of the processing fluid. Typically, spreading of the fluid over the film area is not uniform, particularly, in marginal regions of this area. The presence of undeveloped portions, of course, makes the finished picture effectively worthless.

In an attempt to solve this problem it has been proposed to place the processing fluid in pouches between two superposed sheet elements of the film pack which are secured at their common opposite longitudinal edges by edge-binding brackets. Each bracket has portions which extend inwardly away from the respectively associated longitudinal edge and which thus overlie portions of the external surfaces of the sheet elements. This means that the marginal portions of the film pack have a greater thickness than those portions which are located intermediate the longitudinal edges.

When the film pack is advanced through the nip of the pressure rollers, a pressure is generated upon the sheet elements which squeezes the processing fluid from the pouches and causes it to spread over the exposure area. However, because of the greater thickness of the marginal portions, these portions of the sheet elements are so firmly pressed together that the fluid can not penetrate between them to the border regions of the exposure area, so that these regions will not be properly developed unless the pressure is relieved.

To afford this relief, circumferentially-extending grooves are provided on opposite ends of one of the pressure rollers which is provided with a deformable outer layer. These grooves provide the aforementioned relief function. However, the width and depth of these grooves are very critical for proper development of the border regions of the exposure area. The deformable layer typically has a thickness of about one-tenth of a millimeter, and the depth of the grooves is typically about one-hundredth of a millimeter. If the depth of a groove is too shallow, longitudinal strips of the exposure area remain undeveloped; if the depth of the groove is too deep (for example, if it is even one micron oversized), not enough processing fluid will be present to develop the trailing (as considered in the travel direction of the film pack) corner regions of the exposure area. The technical aspects associated with holding the mechanical tolerances of the grooves have proven to be extremely costly and very difficult to reliably achieve and maintain in practice.

The commonly assigned U.S. Pat. No. 4,017,879 granted to Peter Lermann et al — the entire contents of which are hereby incorporated by reference — has proposed to make the elastic jacket of the one pressure roller more readily deformable at those axially spaced locations where the thicker marginal portions of the film pack pass through the nip between the two pressure rollers, or to form the jacket with circumferential grooves at these locations.

This has, in fact, been found to offer the desired advantages. However, it has also been found that the proposed constructions should desirably be further improved, especially with respect to ease of manufacture.

SUMMARY OF THE INVENTION

Accordingly, it is an object of the invention to provide such further improvements.

More particularly, it is an object to provide a photographic apparatus of the self-developing type which incorporates a pressure roller offering these improvements.

Another object is to provide an improved pressure roller used in such type of apparatus, which is especially simple and inexpensive to manufacture.

Still a further object is to provide an improved method of making such a roller.

In keeping with these objects, and with others which will become apparent hereafter, one feature of the invention resides in a photographic apparatus of the self-developing type. Briefly stated, such an apparatus may comprise a pair of pressure rollers defining with one another a nip, one of the rollers having a rigid cylindrical core provided in an outer circumferential surface thereof with a pair of axially spaced circumferential grooves, elastically compressible means in the grooves, and a jacket of resilient material surrounding the circumferential surface and overlying the grooves; and self-developing film pack means having a pair of juxtaposed sheet elements at least one of which defines an exposure area, edge binders externally overlapping transversely spaced edges of the sheet elements which bound respective margins of the exposure area, and a supply of processing fluid captured between the sheet elements and adapted to be spread over the exposure area, the elastically compressible means being adapted to yield to the edge binders when the film pack means passes through the nip so that the pressure on the edge binders cannot prevent the processing fluid from spreading to the margins.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF A PREFERRED EMBODIMENT

The structural and method aspects of the invention will be discussed jointly for the sake of convenience.

The pressure roller system of the (otherwise not illustrated) camera is represented by the rollers T and A. The roller T serves as the film-pack transporting roller whereas the roller A is a pressure roller which is biased (not shown) against the roller T to define with the same the nip N through which the film pack P passes (after exposure in the camera).

The film pack P is shown in somewhat simplified form as comprising two sheet elements $S_1$ and $S_2$ between which a quantity of processing (developing) fluid F is captured. More details are described in the aforementioned U.S. Pat. No. 4,017,879. At least the longitudinal edges of the sheet elements $S_1$ and $S_2$ (i.e. the edges extending parallel to the direction of travel of the pack P through the nip N) are bound by edge binders R which are generally channel-shaped and embrace these edges at the exterior of the elements $S_1$ and $S_2$.

It should, incidentally, be noted here that while only one set of such edges, one binder R and one axial end position of each roller A and T have been shown, the arrangement will be identically repeated at the other (not shown) ends of roller A, T and the other side of the film pack, except that the other binder R will be mirror-symmetrical with reference to the illustrated one.

If the pressure on the edge E of the binder R were not relieved, the pressure acting via the edge E upon the marginal zone of the sheets $S_1$ and $S_2$ would be so high that the fluid F could not penetrate into this area.

In accordance with the invention this difficulty is avoided by the construction of the roller T. This roller has a cylindrical core TC of rigid (advantageously metallic) material. The outer circumferential surface of core TC is formed at axially spaced locations with two (only one shown) circumferential grooves G which are advantageously of rectangular cross-section. If the core TC is of metal, the grooves may be formed by conventional material-removing (e.g. milling) methods.

Each of the grooves G is filled (flush with the surface of core TC) with elastically compressible material E, e.g. a suitable synthetic plastic material, such as polyvinylchloride (PVC) or the like. The entire length of the core TC is surrounded by a sheath or jacket J of resilient synthetic plastic material, e.g. PVC.

The roller T can be manufactured very simply and inexpensively. The material E may be in form of tubular sections which are slightly stretched and slipped over the core TC and then allowed to contract into the grooves G. The jacket J can be adhesively bonded to the core TC. Still more simply, both the jacket J and the material E may be sections of synthetic plastic material of the type known as "shrink tubing"; in such a case they are placed in their proper position and then, e.g. heated (this is known per se) with the result that they rapidly shrink onto the core TC and are firmly retained thereon by friction. Evidently, the sections forming the material E will be put in place (and shrunk, if applicable) first; then the jacket J will be processed. Should the sections E extend beyond the surface of core TC, it may be necessary to remove some material from them until they are flush with this surface.

While the invention has been illustrated and described as embodied in a pressure roller, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic apparatus of the self-developing type, a combination comprising a pair of pressure rollers defining with one another a nip, one of said rollers having a rigid cylindrical core provided in an outer circumferential surface thereof with a pair of axially spaced circumferential grooves, elastically compressible means in said grooves, and a jacket of resilient synthetic plastic material shrunk onto said core so as to surround said circumferential surface and overlie said grooves; and self-developing film pack means having a pair of juxtaposed sheet elements at least one of which defines an exposure area, edge binders externally overlapping transversely spaced edges of said sheet elements which bound respective margins of said exposure area, and a supply of processing fluid captured between said sheet elements and adapted to be spread over said exposure area, said elastically compressible means being adapted to yield to said edge binders when said film pack means passes through said nip so that the pressure on said edge binders cannot prevent said processing fluid from spreading to said margins.

2. A combination as defined in claim 1, wherein said core of said one roller is of metal.

3. A combination as defined in claim 1, wherein the other of said rollers is of rigid material.

4. A combination as defined in claim 1, wherein said jacket is a tube of elastomeric synthetic plastic material.

5. A combination as defined in claim 1, wherein said jacket is bonded to said core.

6. A combination as defined in claim 1, wherein said elastically compressible means comprises annular members of synthetic plastic material.

7. A method of making a pressure roller for use in a photographic apparatus of the self-developing type, comprising the steps of forming circumferentially extending grooves in an external surface of a rigid cylindrical core; filling said grooves with elastically compressible material; and jacketing said core by shrinking onto it a resilient sheath which overlies said external surface and said elastically compressible material.

8. A method as defined in claim 7, wherein the step of jacketing further comprises bonding the sheath to said core.

* * * * *